| United States Patent [19] | [11] 3,959,600 |
| Sousa | [45] May 25, 1976 |

[54] REMOTELY PROGRAMMABLE CALL DIVERTER

[75] Inventor: Henry P. Sousa, Lawrence, Mass.

[73] Assignee: Arlington Trust Company, Lawrence, Mass.

[22] Filed: Apr. 28, 1975

[21] Appl. No.: 572,027

[52] U.S. Cl. ........................................... 179/18 BE
[51] Int. Cl.² ........................................ H04M 3/54
[58] Field of Search....... 179/18 BE, 18 BA, 18 BD, 179/18 B, 84 L, 84 R, 18 ES

[56] References Cited
UNITED STATES PATENTS
3,704,346  11/1972  Smith et al..................... 179/18 BE

*Primary Examiner*—Thomas A. Robinson
*Attorney, Agent, or Firm*—James J. Cannon, Jr

[57] ABSTRACT

A remotely programmable telephone call forwarding and switching device, or call diverter, having a ring detector with memory capability, an improved dial tone detector, an improved bridging circuit, a capability to program its memory locally and remotely and to confirm the newly programmed number, capable of utilization within telephone systems having a wide diversity of equipment and operational capability, including compatibility with touch and pulse dial systems, and an accessory touch dial encoder for use with rotary dial telephones.

11 Claims, 10 Drawing Figures

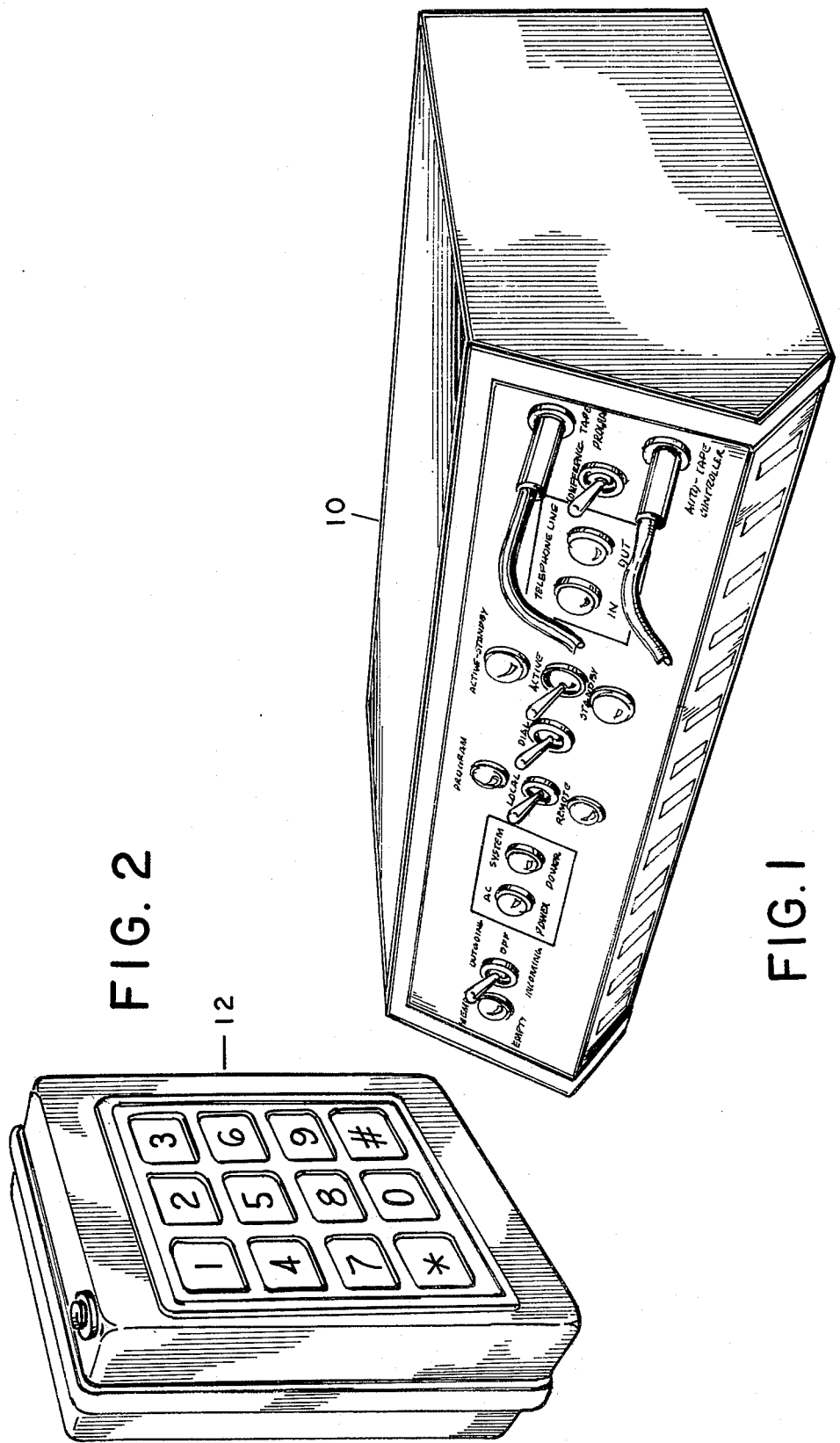

REMOTELY PROGRAMMABLE CALL DIVERTER

BACKGROUND OF THE INVENTION

1. Field of the Invention

The present invention relates in general to remotely programmable automatic telephone call forwarding and switching devices, commonly referred to as call diverters, with variable memories and having improved ring detection, dial tone detection, automatic line bridging, an improved audio bridge and remote programming capabilities. This automatic diverter incorporates circuits which function to answer telephone calls, bridge telephone lines, dial preprogrammed numbers, reprogram its memory locally or remotely, and insure compatibility with the wide diversity of telephone equipment and operational standards now in use including compatability with rotary and touch dial systems.

2. Description of the Prior Art

Call diverters of varying capability have been commercially available for some time. They have had very minimal consumer acceptance, however, for a varity of reasons. The prime reason for their lack of acceptance is their failure to operate reliably with existing telephone equipment and operational conditions, which vary widely from exchange to exchange, from system to system and from company to company. Each individual telephone call diverter marketed in the past has suffered from one or more major deficiencies which effectively inhibited its value and utility. In general, the more common deficiencies prevalent in the prior art are timing problems encountered in handling calls between exchanges, timing problems in the occurrence of dial tones, failure to recognize the wide range of dial tones provided by various exchanges and systems, the confusion of noise on telephone lines with dial tones, and incompatability with both rotary dial and touch dial equipment. A host of minor problems are also present in the prior art units. Furthermore, the prior art units were very expensive to manufacture.

The present invention represents an improvement over the prior art based on careful analysis of and experimentation with existing units, incorporating many minor improvements in operation and circuitry and major improvements in timing, memory, dial tone detection, line bridging and compatability with existing telephone equipment.

Many of the improvements herein disclosed are directed both to improve operational performance and to savings in costs of manufacturing, installation and maintenance.

The prior art is best represented in U.S. Pat. No. 3,704,346 which presents a detailed analysis of the nature, functions and circuitry of a remotely programmable call diverter and fairly represents the state of the art as of its filing date. This disclosure will not, so far as possible, repeat those functional explanations common to all call diverters which appear in that prior patent, but will stress the differences and improvements of the present diverter.

Any remotely programmable call forwarding device of necessity requires that the telephone subscriber have two separate telephone lines, one for receiving incoming calls, henceforth called line A, and another, henceforth called line B, for carrying the forwarded call from the call diverting device to the telephone instrument at the number the call has been diverted to. In the present invention, line B is also used to reprogram by touch dial techniques a new telephone number into the diverter's memory from a location remote from the diverter itself. Such call forwarding devices must also include ring detection means, dial tone detection means, means to store a telephone number in memory, means to bridge lines A and B, means to dial out the telephone number stored in memory, and means to program or reprogram the device from a remote location. In contrast to prior art devices, it is also desirable that there be some way to verify from a remote location that a newly programmed telephone number has been properly stored in the diverting device's memory, as in the present disclosure.

The improved dial tone detector in the present invention enables the diverter disclosed in this application to overcome the significant problem in the prior art which arises because other dial tone detectors are frequently deceived into interpreting as a dial tone some other signal or noise commonly found on telephone lines. For example, some prior art dial tone detectors commonly monitor the telephone lines for the persistence over some appropriate time period of a particular amplitude level in the audio frequency range. Other prior art dial tone detectors look for a particular frequency or frequencies of dial tones. But the audio frequency range is very broad (from approximately 300 to 3000 Hz) and signals other than dial tone signals may and often do persist on telephone lines at the amplitude levels chosen. Such signals are then misinterpreted as dial tone signals and the diverting device resets, thereby interrupting conversations. Certain types of noise or conversation may produce this abort result, as may Touch Tone (R) signals, background microwave noise where a long distance call is being carried on microwave networks, and tape hiss where the diverter reaches a telephone answering machine with a prerecorded tape message. Also, these detectors frequently fail when lines A and B are on different exchanges.

To avoid all of these problems, the improved dial tone detector of the present invention looks instead for the persistence over an appropriate time period of a signal in only that limited portion of the audio frequency range where dial tone signals are found. Thus, instead of seeking a constant amplitude over a frequency spectrum ranging from approximately 300 to 3000 Hz, the dial tone detector of the present invention looks for the persistence of an appropriate signal in the frequency range between approximately 180 and 800 Hz, which is where dial tone is found. The dial tone detection means of the present invention itself filters out signals below 180 Hz at the low frequency end of the dial tone spectrum and because an operational amplifier that feeds information from the telephone line to the dial tone detector contains a filtering device, the dial tone detector does not receive signals above 800 Hz at the high frequency end. A major object of the present invention is to accomplish detection of dial tone while at the same time avoiding the problem common in the prior art of misdetecting other signals commonly found on telephone lines as dial tone. In extensive testing, it has been found that the dial tone detection of the present invention will unfailingly detect any continuous tone in the appropriate frequency interval as dial tone and reject other non-dial tone signals. As a result, the call diverter claimed in the present application can be connected to two telephone lines from two different telephone exchanges or even from two entirely different telephone systems and still successfully forward calls, thereby overcoming a major problem in the prior art, namely, the common problem of calls being disconnected because a diverter is unable to recognize different types of signals from different exchanges or systems both as dial tones.

It is also an object of the present invention to provide such accurate detection without the necessity of any field calibration of the dial tone detector and at a significantly lower cost than has previously been possible even for less discriminating dial tone detectors.

Prior art devices have also failed to function well in a variety of telephone environments because of simple timing problems. As an example, the time it takes a telephone central exchange to furnish a dial tone to a subscriber varies widely from exchange to exchange, partially as a function of the equipment in the exchange and partially as a function of the volume of calls being handled at the time. Some prior art devices have initiated dialing solely as a function of time, and lost calls because of the failure to wait for a dial tone. Some prior art devices have bridged the incoming line to the outgoing line prior to establishing an interconnection on the outgoing line. Depending on when a particular prior art device bridged the lines, numerous problems were incurred. Sometimes line A was seized too early, causing a disconnect to the caller. Sometimes line A was seized during the dial out on line B, confusing the calling party. If line A was seized before determining that line B was available and a dial tone occurred on line B, the caller would hear the diverter operate and assume he had a bad line, thereby terminating his call. In any event, an early seizure of line A results in a completed call to the caller, with charges, even though the diverter malfunctioned or was unable, for any of a variety of reasons, to divert the call. The diverter of the present invention utilizes an elaborate sequence of electronic delays at crucial stages in the sequence of its operations which serve to compensate for varying operational conditions and varying speeds of the telephone company equipment, to compensate for the distances over which calls, incoming or outgoing, must travel, and for the psychological impact of a diverted call on the caller. While these delays are timed delays, the times are consistent with operational conditions most frequently encountered in telephone calling, both from the point of view of functioning equipment and from the point of view of the impatient caller. These timed delays also permit automatic bridging between lines A and B through an auto-bridging circuit which compensates for varying operational conditions.

While the dial tone detector, the timing sequence, the autobridging circuit, and the audio bridge represent the major improvements over prior art devices disclosed herein, other improvements are also present and will be disclosed in the description of the preferred embodiment. All such improvements are directed toward increased reliability, increased capability, improved compatability and lower manufacturing, installation and maintenance costs.

SUMMARY OF THE INVENTION

This invention pertains to an improved remotely programmable call forwarding and switching system for the diversion of telephone calls, commonly known as a call diverter. Call diverters commonly contain circuitry which can perform a number of functions beyond call diversion, such as automatic dialing, conference call bridging, answering calls with prerecorded messages and the like. Many of such features are optional, but are feasible with minimal additional circuitry. The system of the present invention is adaptable to include all such options. Any remotely programmable call forwarding device of necessity requires that the telephone subscriber have at least two separate telephone lines, one for receiving incoming calls, henceforth called line A, and another, henceforth called line B, for carrying the forwarded call from the call diverting device to the telephone instrument at the number to which the call is being diverted. In the present invention, line B is also used to reprogram a new telephone number into the diverter's memory from a location remote from the diverter itself. Such call forwarding devices must also include ring detection means, dial tone detection means, means to store a telephone number in memory, and means to bridge lines A and B, means to dial out the telephone number stored in memory, and means to program or reprogram the memory of the device with another number from a remote location. It also incorporates a means to verify from a remote location that a newly programmed telephone number has been properly stored in the memory of the diverting device.

The diverter of the present invention, when connected to the subscriber's two telephone lines and turned on, is ready to perform its various functions, which for the most part are activated by the detection of a ringing condition. The function of a ring detection means is to monitor telephone lines A and B without presenting an adverse load to those lines, without affecting the normal use of those lines, and to differentiate between a ringing signal and noise commonly found on those lines, that is to determine whether or not information coming along a telephone line is in fact a ringing signal. If a ring is detected on line A by the ring detector, the ring detector activates the other functional units of the diverter so that the incoming call may be diverted. If a ring is detected on line B, the diverter is prepared to accept new instructions.

In the present invention, the improved ring detection means, which is directly coupled to the telephone lines, distinguishes between a call that is to be diverted to another location (incoming on line A) and one the purpose of which is to reprogram the diverter's memory (incoming on line B). If the ring detection means detects a ringing signal on line A, a data in memory flip-flop is checked to determine whether or not the diverter's memory, which can store manifestations of numbers representing previously programmed digits, contains a telephone number. If, and only if, there is data in memory, line B is seized and the dial tone detection means is actuated. If there is no data in memory, the ring detection means returns to an active standby mode. If the ring detection means detects a ringing signal on line B, line B is seized and the means to program or reprogram the diverter's memory from a remote location is activated.

The sequence of functions performed by the diverter of the present application and the timing of the sequence of functions is critical to the novelty of the diverter. The ring detection means remembers the first ring by initiating the appropriate actions immediately but it does not seize the ringing line until it knows that it is ready to perform the required functions. The time taken to prepare the diverter to function before the ringing line is seized or answered, insures that the diverter will not seize the ringing line too early in the ring cycle and confuse the calling party.

The function of the dial tone detection means is to monitor the telephone lines for the presence of a dial tone. The dial tone detection means is designed to respond only to a signal between approximately 180 and 800 Hz which persists over 100 milliseconds. The improvement in the present invention, which will be described below, prevents the dial tone detection means from being deceived into recognizing as a dial tone other signals commonly found on telephone lines.

If a proper ringing signal has been detected on line A, and there is data in memory, line B is seized, the dial tone detection means (dial tone detector) is activated, and a twenty second delay is turned on. If the dial tone detector finds no dial tone on line B within 20 seconds, the system is reset and returns to active standby. If, however, a dial tone is monitored on line B within 20 seconds, a shift register memory dials out on line B the telephone number previously stored in it. At the termination of this dialing function, an auto-bridging circuit is activated, the bridge delay period of which is automatically adjusted to meet local telephone company equipment and operating conditions as well as customer calling situations. However, this delay never exceeds thirty seconds. When the auto-bridging circuit is satisfied, line A is seized and audio bridging is established between lines A and B through a bidirectional amplifier which boosts the audio signals transmitted between lines A and B. If a dial tone is subsequently detected on the bridged interconnection between lines A and B, as might occur, for example, when the original caller hung up, the system is reset and returns to active standby.

Again, the sequence of functions and the timing are critical to successful operation. Line A is seized only after the dial out on line B is successfully completed. If, for any reason there is an abort on the dial out procedure, the caller has no charge for the call since his ring was never answered. The activation of the audio bridge between line A and line B as the last step in the sequence of operations prevents a premature bridging which, in prior art devices, confused the calling party and frequently caused the caller to hang up.

The function of the remote programming means is to allow an authorized user of the call diverter claimed herein to enter or change a programmed number from a location remote from the diverter itself. The telephone number to which the diverter will forward an incoming telephone call and more specifically, the improvement claimed in the present invention, allows an authorized user to reprogram the diverter's memory by using Touch Tone (R) signals instead of the pulse modulated carrier system revealed in the prior art. When a line B ring is detected by the ring detector means, a twenty-second delay is initiated, the tone decoder is turned on and line B is seized. If the caller does not enter the appropriate access code, usually a particular touch tone digit, within said 20 second delay period, the system is reset and returned to active standby. If, however, the caller does enter the proper access code, a write instruction, a 60 second timer, and the dial tone detector are turned on. The caller then has 60 seconds to erase the number in the diverter's memory and/or to program a new telephone number into the diverter's memory by using Touch-Tone signals. When an erase or reprogramming instruction is completed and the caller has hung up, thereby causing a dial tone to appear on the line, or if said 60 second timer has timed out, the diverter initiates a confirmation sequence. The write instruction is turned off, line B is dropped, a 5 second delay is initiated at the end of which a confirmation call is generated. Then line B is seized and a dialing sequence is initiated. When the read instruction is turned on, a 5 second timer is also turned on. The read instruction first checks a specific memory location to see if data is stored. If data is present, it sets the data-in-memory flip-flop and proceeds with a dial out. If no data is found in memory, an abort procedure is initiated. If a confirmation call is required, as opposed to the diversion of an incoming call, a 60 second timer is turned on during which the telephone at the number stored in the diverter's memory will ring, thereby confirming that the number has properly been stored in memory. At the end of said 60 second period, ringing will cease, the system will reset, and return to the active standby mode.

The programming of the diverter is accomplished with a touch dial system and requires a tone decoder whose function is to monitor line B in order to determine whether information on that line is Touch Tone information, whether such information, if any, is designed to provide access to the diverter's memory, and when there is such access, to convert analog Touch Tone signal information to serial pulse digital information suitable for storing in the diverter's memory. Typically, an authorized user of the diverter who wishes to change the telephone number stored in its memory will call the diverter on line B. If he enters the proper prearranged Touch Tone access code, he will in fact set an access flip-flop, which when set generates a write instruction and gives the caller direct access to the diverter's memory. If a caller does not enter the access code identifying himself as an authorized individual, the tone decoder will ignore any future information from that caller. The prior art primarily makes use of pulse modulated carrier signals instead of Touch Tone signals to reach and reprogram the diverter's memory. Touch Tone information, however, which to represent a particular single digit requires the simultaneous use of 2 tones, one of high frequency and one of low frequency, is more compatible with present day telephone systems, and will increasingly become still more compatible; it is also virtually error-proof compared to the far higher probability of error inherent in the use of single frequency transmissions, however generated. Therefore, it is an object of the present invention to provide a more reliable means to reprogram the diverter's memory from a location remote from the diverter itself, and to do so in a way that is more compatible with telephone systems themselves, and which is accordingly less expensive to the user of the diverter. Typically, a user will be able to use the telephone instrument itself in a Touch Tone exchange to reach and reliably reprogram the diverter's memory. In those telephone exchanges that continue to use rotary dials, a separate Touch Tone pad may be used to gain the advantages of Touch Tone reprogramming and to avoid the unreliability hazards inherent in using single frequency transient pulses to reprogram the diverter's memory, e.g. to avoid the problem arising from sounds other than reprogramming signals being interpreted as reprogramming information. The separate tone pad may also be used to program the diverter locally without using a telephone line.

The memory of the call diverter is a standard commercially available shift register having sufficient capacity to store the longest telephone numbers presently anticipated, even for world-wide direct distance dialing. The memory also has an adjustable switch which permits the adjustment of timing of interdigit pauses between the stored digits. This also permits an adjustable dial out at varying speeds according to local telephone company operating procedures and enables the diverter to dial out at speeds up to 50 percent faster than published telephone company standards.

The automatic bridging of line A to line B in the case of a diverted call is accomplished by adding a modified dial tone detector which is activated upon completion of a dial out and which detects any signal on line B. As soon as a signal on line B is detected, line A is bridged to line B, but in no event is the bridging delayed for more than 30 seconds.

The audio bridge of the present diverter utilizes two transformers rather than one as in the prior art to compensate for the differential in impedance which is frequently found on lines A and B. This bridge has no active elements and is extremely reliable.

To summarize, the call diverter of the present invention represents a significant improvement over the prior art, while incorporating the miscellaneous auxiliary functions normally found on call diverters. Such features of this diverter include local and remote programming, a standby switch that deactivates the unit and is controlled locally or remotely, conference calling, line monitoring and others.

BRIEF DESCRIPTION OF THE DRAWINGS

FIG. 1 is a perspective view of the call diverter of the present invention.

FIG. 2 is a perspective view of the touch dial pad used to program remotely the call diverter of FIG. 1.

DESCRIPTION OF THE PREFERRED EMBODIMENT

Figure 3:
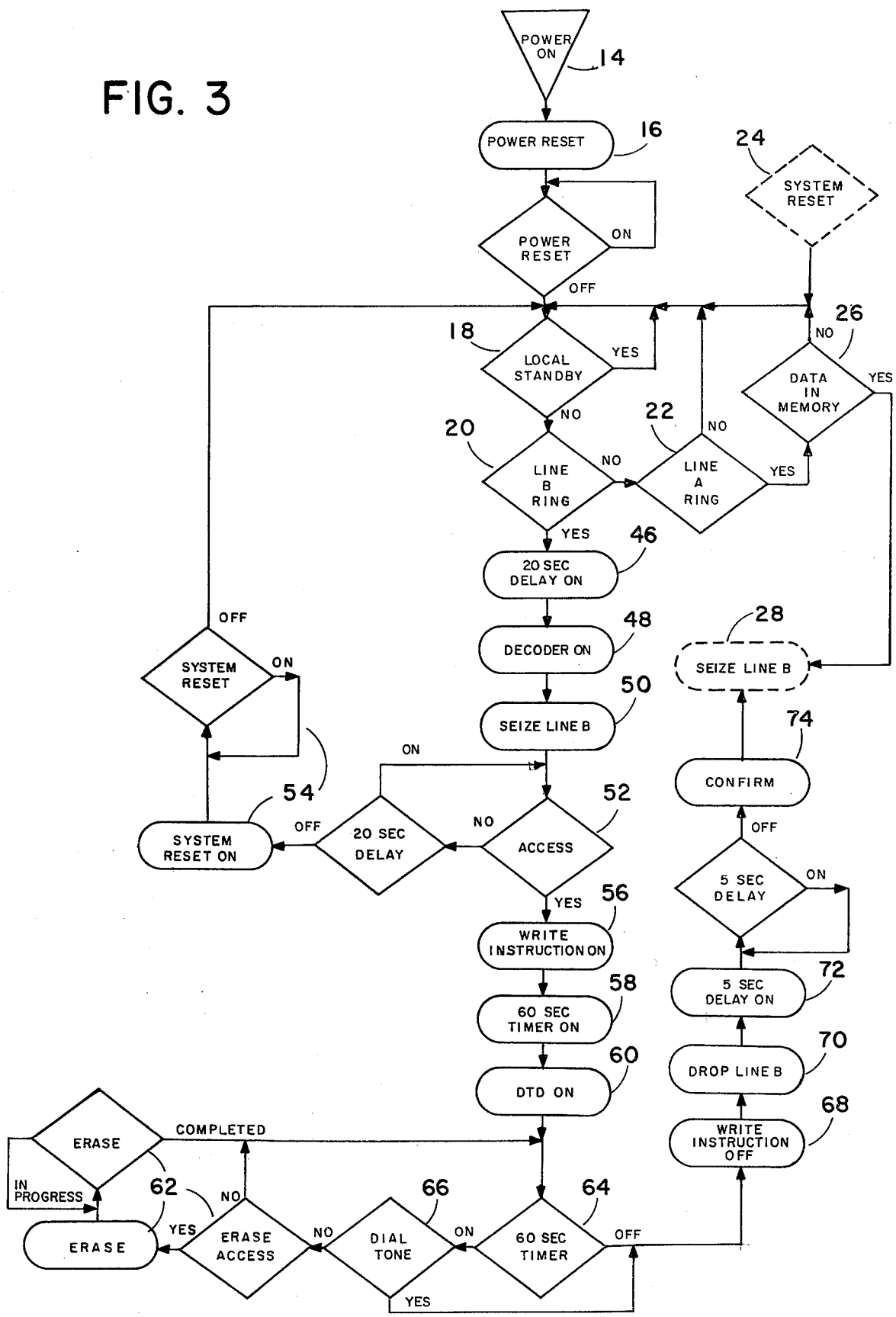
FIGS. 3 and 4 are a flow diagram of the primary functions of the call diverter of the present invention.

Referring now to the drawings, and, in particular, to FIGS. 1 and 2, FIG. 1 illustrates in perspective the call diverter 10 of the present invention and FIG. 2 illustrates an optical tone encoder 12 which is used to program or reprogram call diverter 10 from a remote location not equipped with a touch dial telephone, or by direct access for local programming, connected by wire to diverter 10.

Figure 4:
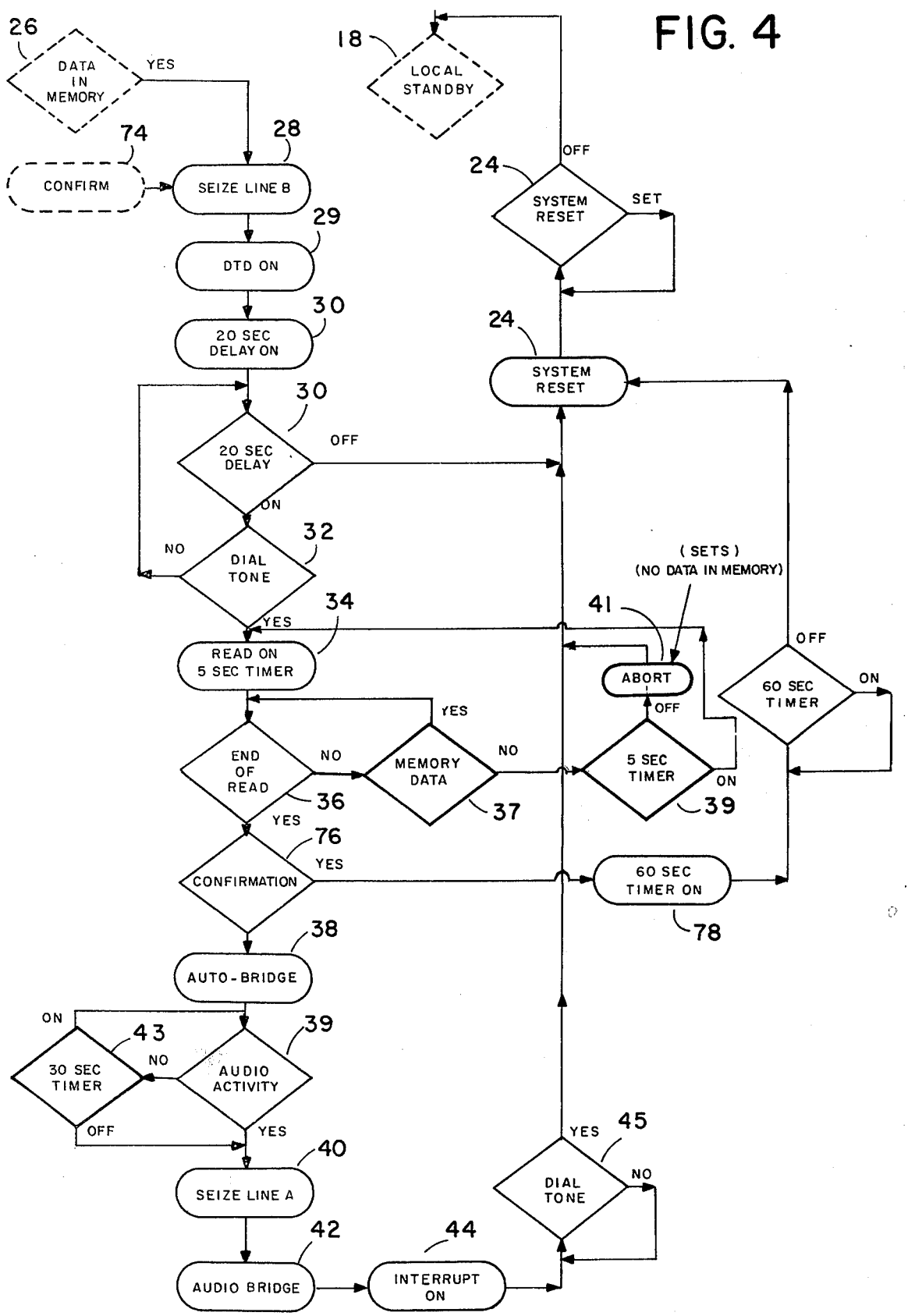

Referring now to FIGS. 3 and 4, there is shown a flow chart of the central circuitry of call diverter 10. For the sake of clarity, some obvious auxiliary functions have been omitted from these Figures. Referring now to FIG. 3, call diverter 10 is powered through a line cord by standard commercially available electrical service. Call diverter 10 may also be powered by commercially available batteries. After connecting call diverter 10 to two telephone lines and a source of electrical power, the first step is to turn power on 14 by a commercially available power switch, which can turn the power on or off at the diverter 10. After power is turned on, the abort circuit, illustrated in FIG. 10, clears diverter 10 in a power reset 16 sequence. With power on 14 and power reset 16 completed, if call diverter 10 is not placed in the local inactive standby 18 mode, it is ready to receive incoming telephone calls on a first line henceforth called line A, which is normally used for calls to be diverted, or on a second line, henceforth called line B, on which remote programming calls are normally received. This is an active standby mode.

Figure 5:
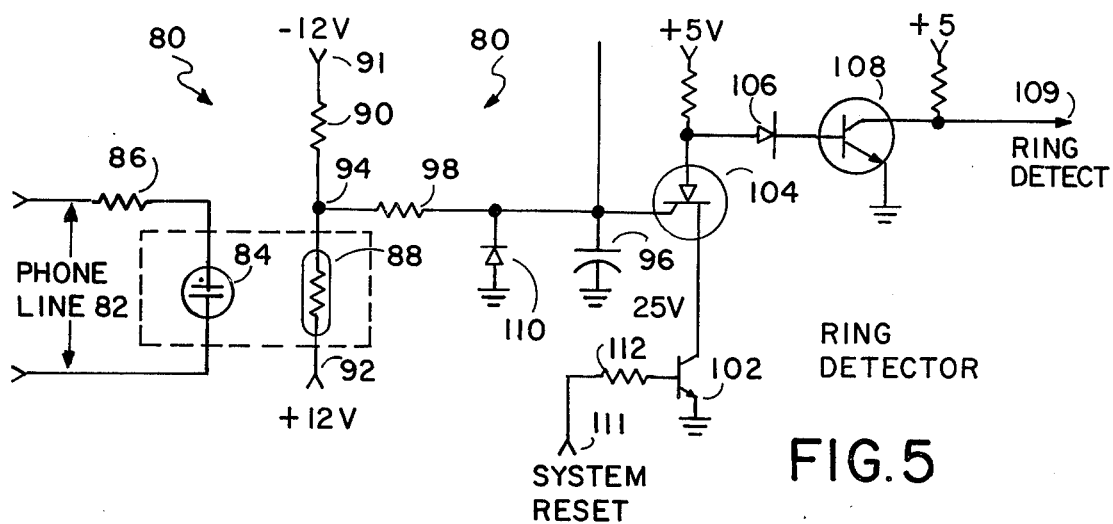
FIG. 5 is a schematic diagram of the ring detector of the call diverter of FIG. 1.

If either line A or line B rings, the first function of call diverter 10 is to detect that ring. This is accomplished by an improved ring detection means which is illustrated in FIG. 5 and described in detail hereafter. Priority in ring detection is given to line B ring if both lines ring simultaneously. Upon detection of a ring, call diverter first checks for a line B ring 20. If the ring detection means finds no ring on line B it then checks for a line A ring 22. If no ring is found on line A, the system remains in active standby. If a ring is found on line A, call diverter checks for a data in memory 26 flip-flop. If the data in memory flip-flop is not set the system ignores a line A ring 22. If data in memory 26 is set, that data would be a telephone number to which the incoming call is to be diverted.

At this point call diverter 10 seizes line B 28 (FIG. 4), but has not yet seized line A, which is still ringing. The diverter then turns on the dial tone detection means 29, illustrated in FIG. 6 and described in detail hereinafter. Diverter 10 also turns on a 20 seconds, delay 30 timer to allow time for the local exchange to supply a dial tone. If no dial tone is detected in 20 seconds, the system resets 24 and goes to an active standby mode. If a dial tone 32 is detected, the telephone number stored in memory 26 is read out 34 and at the end of the read 36 an auto-bridging 38 circuit is activated. The purpose of auto-bridging circuit 38 is to allow the telephone company equipment sufficient time to establish a connection with the telephone dialed from line B. A bridge delay, which is an automatically adjusted time period which is function of local telephone company equipment and customer requirements, is initiated and is terminated upon the detection of audio activity 39 on line B, but is not allowed to exceed 30 seconds 43. At the conclusion of the bridge delay the telephone dialed should be ringing, line A is still ringing and diverter 10 seizes line A 40 and establishes an audio bridge 42 between line A and line B. At this point the incoming call has been diverted to the number stored as data in memory 37. Until there is a disconnect in said call, both lines A and B call diverter 10 are in use and no new cells can be received. To insure that a disconnection is noted as soon as it occurs, an interrupt 44 circuit is turned on. This interrupt 44 circuit, illustrated in FIG. 7 and described in detail hereinafter, pulses line A every thirty seconds, while not interferring with the audio path. It also turns on the dial tone detection means. The purpose of interrupt 44 is to force the return of a dial tone. When a dial tone 45 is detected it resets the system 24 and returns it to active standby. Thus a diverted call is terminated.

If the ring detection means detects a ring on line B 20, a 20 second delay 46 is turned on, a tone decoder 48 is turned on and then diverter 10 seizes line B 50. Call diverter 10 also knows that it is to expect a reprogramming call and it waits for the caller to enter an access code 52. If the access code 52 is not entered within 20 seconds the system resets 54 and returns to active standby. If the access code 52 is entered, the memory write instruction 56 is turned on, a 60 second timer 58 is turned on, and the dial tone detection 60 means is turned on. The tone decoder 48, illustrated in FIG. 8 and described in detail later converts tone signals to serial pulse information. The caller who enters the proper access code is then free to enter a telephone number in the memory of call diverter 10. The caller has 60 seconds in which to enter the number. If the caller entering the new number makes a mistake he can erase 62 and start over. When the 60 second timer goes off 64, or a dial tone 66 returns, the write instruction 68 is turned off, line B is dropped 70 and a 5 second delay 72 is started. At the end of the 5 second delay, the system commences to confirm 74 the newly programmed number. It seizes line B 28 and commences a dial out as described previously.

The dial out procedure begins with the read on 34 instruction to the memory 37. The first step is to check a specific location in memory 37 for data. If data is present, the data in memory flip-flop 26 is set and the read continues. (If there is no data in memory, the 5 second timer will go off 39, the no data in memory 41 circuit will activate the abort circuit, illustrated and described hereinafter.) At the end of read 36, the diverter branches to a confirmation 76 call (FIG. 4) and turns on a 60 second timer 78. During this time, the confirmation call connection is completed and the newly programmed number rings. At the end of 60 seconds, the systems drops line B. If the caller is at the reprogrammed number, he knows that he has successfully reprogrammed call diverter 10.

Referring now to FIG. 5, wherein is illustrated the ring detection means 80 of call diverter 10, two telephone wires 82 (telephone line) are connected across contact pins (FIG. 9) of ring detection means 80. The voltage on the telephone line 82 when not in use is commonly 48 volts. Telephone line 82 sees the impedance of a neon tube 84 connected in series with a 147K ohm resistor 86. The nominal breakdown voltage for such a tube 84 is approximately 70 volts. Since it is prebiased by 48 volts, a ringing signal in excess of 22 volts peak will fire the neon tube 84. When neon tube 84 fires upon the application of a ringing signal to the circuit, a light sensing variable resistor 88, which offers a very high resistance when no ring signal exists (e.g., in excess of 100K ohms), and whose resistance is inversely proportional to the intensity of light emitted by the neon tube 84, experiences a large diminution in resistance. Connected in series with said light sensing variable resistor 88 is another resistor 90. Resistor 90 is connected to a voltage source of −12 volts and light sensing variable resistor 88 is connected to a voltage source 92 of +12 volts. Because of the very high resistance of light sensing variable resistor 88, a negative voltage appears at the junction 94 of the two resistors 88, 90 when the telephone line 82 is not ringing. However, when a ringing signal is applied, the resistance of the light sensing variable resistor 88 diminishes (e.g., to 300 to 400 ohms), and the voltage at the junction 94 of resistors 88, 90 becomes positive in value. As a result, capacitor 96 charges through resistor 98 connected at junction 94. When NPN junction transistor 102 is on and capacitor 96 reaches a positive voltage level sufficient to fire the gate of silicon controlled rectifier (SCR) 104, SCR 104 fires, pulling the anode potential of semiconductor diode 106 down to a value substantially below the threshold level of diode 106 and the base emitter threshold of NPN junction transistor 108. As a result transistor 108 is turned off and a positive indication appears on pin 109 as the proper output of the ring detection means 80.

In effect, when SCR 104 fires, the ring detection means 80 henceforth "remembers" that it has heard a ringing signal, and it instructs the logic within call diverter 10 to take appropriate action. What is appropriate action will depend on whether a ringing signal has been detected on line A or B. The diverting device as a whole incorporates two ring detection circuits 80, one each on line A and line B.

Eventually the ringing signal will cease (for example, when the telephone is answered), and when that happens light sensing variable resistor 88 will return to a high value and the voltage at the junction 94 of resistors 88, 90 will become negative again. However, ring detection means still "remembers" the ring detection because SCR has not yet been turned off. Consequently, capacitor 96 will discharge through resistor 98 until it reaches the negative voltage clamped by semiconductor diode 110. SCR 104, however, remains on, i.e. it remembers it has heard a ringing signal. To erase the memory of the ring detection means, a clear instruction is fed from the system reset 111 to the base drive for NPN transistor 102 and connected to it through resistor 112. As a result of such an instruction, transistor 102 turns off, thereby removing the primary current source from SCR 104, which in turn causes SCR 104 to turn off, i.e. to reset. Because the tolerance of resistors 88, 90 may be very broad, the precise value of the negative voltage that appears at their junction 94 when the telephone line 82 is not in use is very difficult to predict. Therefore, semiconductor diode 110 is placed in the circuit to prevent the negative voltage which is applied to SCR 104 and across capacitor 96 in the wrong polarity from damaging either SCR 104 or capacitor 96.

Figure 6:
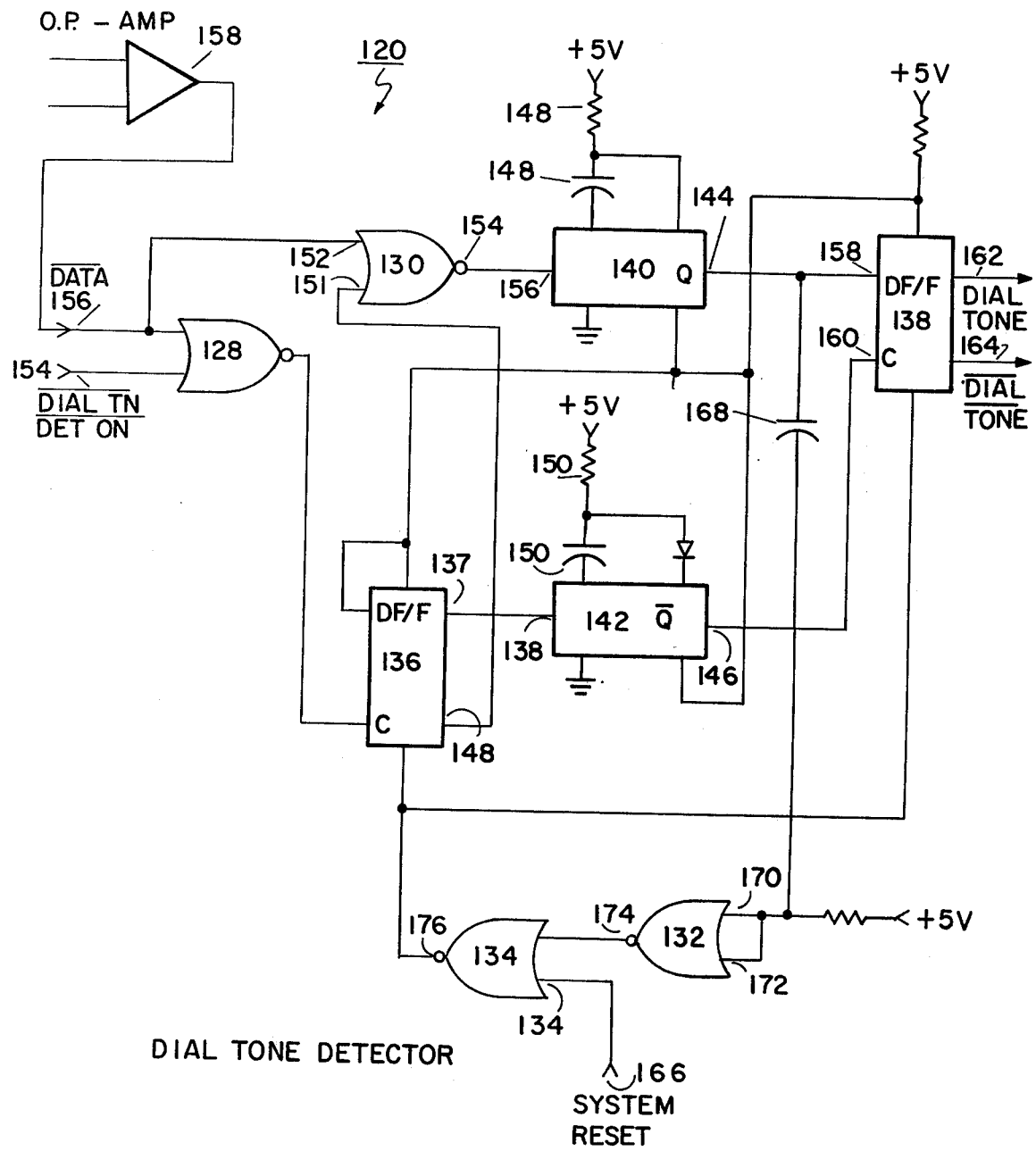
FIG. 6 is a schematic diagram of the dial tone detector of the call diverter of FIG. 1.

Referring now to FIG. 6, wherein is illustrated the dial tone detection circuit 120, it should be remembered that the function of the dial tone detector 120 is to detect the presence of a dial tone on line B or on the bridge between line A and line B. This is used both to indicate a dial out on line B and to determine the termination of a reprogramming call on line B or a diverted call bridged between line A and line B.

In the preferred embodiment, the dial tone detection means 120 includes three dual in-line transistor-transistor logic integrated circuits. One integrated circuit package contains four two-input positive logic NOR gates, indicated on FIG. 6 as 128, 130, 132, and 134. Another contains two independent edge triggered D-type flip-flops, 136 and 138. The third contains a dual retriggerable monostable multivibrator itself comprising two half circuits, 140 and 142, having a total of two outputs, 144 and 146, with connected RC circuits 148 and 150 that determine the width of the pulse generated. The dial tone detector is powered by a +5 volt regulated supply. It is fed by the $\overline{\text{DIAL TN DET ON}}$ 154 and $\overline{\text{DATA}}$ 156 lines. The $\overline{\text{DIAL TN DET ON}}$ line 154 forwards information from the ring detector 80, as described above. The $\overline{\text{DATA}}$ 156 line forwards information from a 741-type frequency compensated monolithic integrated circuit operational amplifier 158 at the interface between the telephone lines 82 and the diverter 10. Such operational amplifiers are well known in the prior art. In the present invention, said operational amplifier 158 is adjusted to filter out any signal above approximately 800 Hz, thereby limiting at the upper end of the frequency spectrum the signals presented to the dial tone detector 120, lest it be deceived into interpreting as dial tone a signal that is not a dial tone.

In effect, both halves 140 and 142 of the retriggerable multivibrators monitor the $\overline{DATA}$ 156 line. When there is a logic level zero indication on the $\overline{DIAL\ TN\ DET\ ON}$ line 154, any activity on the $\overline{DATA}$ line 156 will satisfy the gating requirements of NOR gate 128 and will cause flip-flop 136 to set. When flip-flop 136 sets, its outputs 137 causes one half of the multivibrator circuit 142 to fire through input 138. Also, when flip-flop 136 sets, its output 148 coupled with manifestation of activity on the $\overline{DATA}$ line becomes an input to NOR gate 130 at pins 151 and 152 respectively. When the requirements of NOR gates 130 are satisfied, it produces an output at pin 154, which output received as an input to multivibrator half circuit 140 at pin 156 causes said multivibrator half circuit 140 to fire. Thus, each half of the total multivibrator circuit fires simultaneously from two different sources although from the same initial cause.

The timing of multivibrator half circuit 140 is set so that it differentiates between signals above and below a threshold frequency level of approximately 180 Hz. Thus the dial tone detector itself filters out signals below 180 Hz, which is the low end of the dial tone frequency spectrum. Further when the repetition rate of the input signal is faster than the repetition rate of multivibrator half circuit 140, said half circuit 140 will constantly be retriggered. Multivibrator half circuit 142, on the other hand, sets only once when the input is of a continuous tone, at least 5 seconds in duration. The output of both halves 140 and 142 of the multivibrator goes through pins 144 and 146 respectively to the input pins 158 and 160 of flip-flop 138. When the gating requirements of flip-flop 138 are satisfied, it will set, thereby indicating as an output on pin 162 that a dial tone has in fact been detected.

Thus when the $\overline{DATA}$ line forwards a continuous tone signal with a frequency above 180 Hz, one half 140 of the multivibrator circuit is constantly retriggered and therefore never times out, while the other one half 142 of the multivibrator circuit, having once been fired, times out. This satisfies the gating requirements of flip-flop 138, which therefore sets. Flip-flop 138 remains set until the dial tone is removed, at which point it will reset, or until a system reset instruction is applied externally through pin 166.

If instead the $\overline{DATA}$ line forwards an intermittent signal above 180 Hz, and if the $\overline{DATA}$ line having once forwarded a signal no longer does so (for example, if for whatever reason there is no dial tone on the telephone line being monitored), both halves 140 and 142 of the multivibrator will initially set, but half 140 will now time out. When it does so it couples a negative excursion through capacitor 168 into input pins 170 and 172 of NOR gates 132 and thence through output pin 174 and NOR gate 134, whose output at pin 176 causes both flip-flop 138 and 136 to reset. The dial tone detector can also be reset by an instruction coming in on pin 166. If a dial tone is detected, it is processed according to the mode of call diverter 10 at the time it is detected.

The memory 37 which is shown in the flow chart of FIG. 4 is a standard commercially available shift register containing six registers, each of 32 bit capacity in the serial number system. An interdigit pause counter (not shown) incorporates a pause of 2, 4, or 8 dial clock periods and places a 400 to 600 millisecond pause between each digit (interdigit pause) during the programming procedure.

Figure 8:
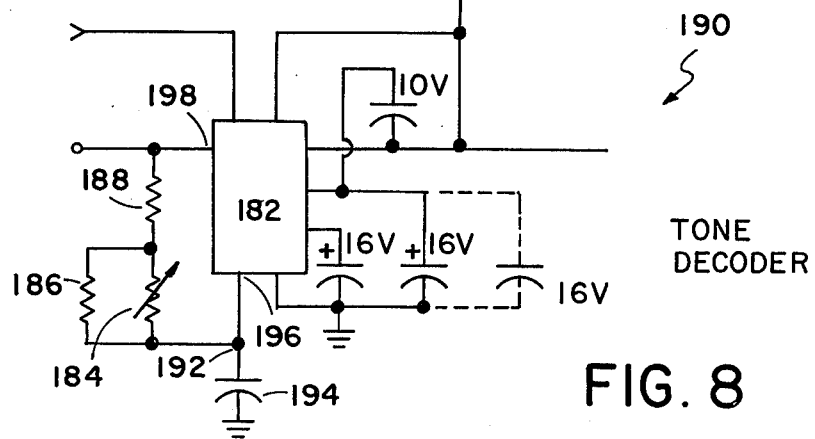
FIG. 8 is a schematic diagram of the tone decoder of the call diverter of FIG. 1.

Referring now to FIG. 8 wherein there is illustrated the electrical circuit for the tone decoder 190, tone decoder 190 is used to convert tone signals into logic level signals which are then converted from parallel decimal information into serial decimal information incorporating the interdigit pause for storage in memory 37. The access code is also recognized by this logic using standard digital comparator techniques. Where applicable, using reference numerals from FIG. 3, tone decoder 190 is turned on 48 after detection of a line B ring 20. Decoder 190 listens for a tone signal for 20 seconds 46. If no signal is detected, diverter 10 resets 54 and returns to active standby. If a tone signal is detected this signal is compared against a preset access code 52. If the access code 52 is not detected the system resets 54. If the access code 52 is present, a 60 second timer is set 58, a write instruction 56 is turned on and an access flip-flops 52 is set. The system will automatically reset 54 if the programming is unsuccessful. Otherwise the confirmation 74 sequence is initiated.

Referring now to FIG. 8, there are seven tone decoders 190 present in call diverter 10, each one calibrated to detect one of the seven tones used to generate signals for twelve key tone pads, and to convert any two tone signals satisfying Touch Tone format standards of the telephone company to logic level information for storage in the shift register of memory 37. Each of the tone decoders 190 has similar components, selected such that each looks for a different tone. Tone decoder 190 is basically a phase lock loop with a built in voltage controlled oscillator 182, whose frequency of oscillation is controlled by three resistors in series with a capacitor. Variable resistor 184 is connected in parallel with resistor 186 and in series with resistor 188. Resistor 188 is connected to oscillator 182 at input 198 and the junction 192 of variable resistor 184 and capacitor 194 is connected to oscillator 182 at input 196. Varying the values of these resistors and capacitor varies the frequency of oscillation of oscillator 182. The advantage of this circuit is that it uses very inexpensive components. The output of the logic circuit goes to shift register memory 37.

Figure 9:
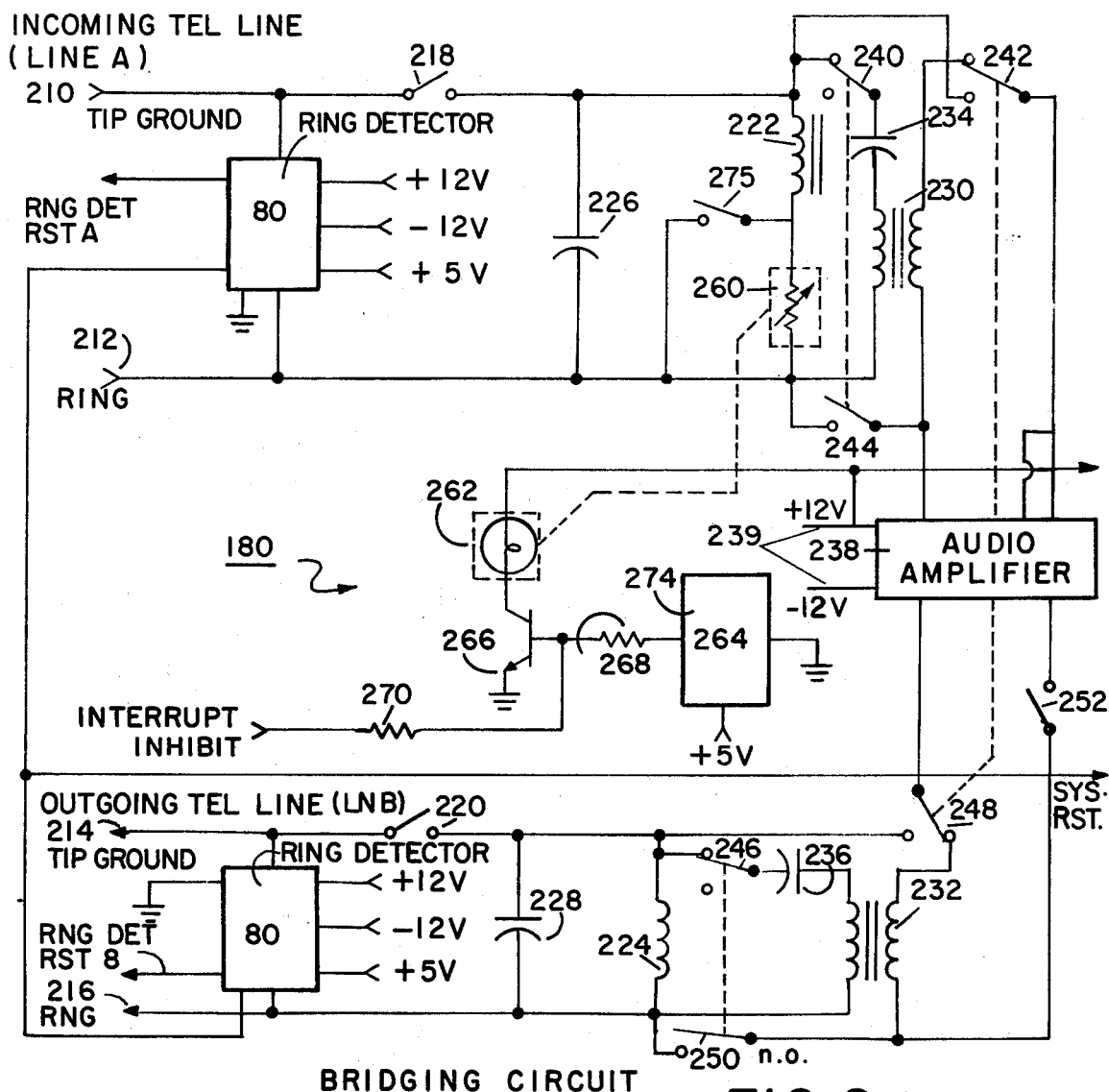
FIG. 9 is a schematic diagram of the bridging circuit used in the call diverter of FIG. 1.

FIG. 9 illustrates the preferred embodiment of the circuitry that causes bridging between lines A and B. It also shows the line A ring detector 80 and the line B ring detector 80 connected directly across the tip-ground wires 210, 214 and the ring wires 212, 216 of lines A and B. FIG. 9 further illustrates the way in which interrupt circuitry 180 is connected to line A. With respect to audio bridging between lines A and B, FIG. 9 shows relays 218, 220 connected to the tip-ground wires 210, 214 of lines A and B. When relays 218, 220 are closed, holding coils 222, 224 effectively seize and answer lines A and B respectively, and supply the DC return paths between tip-ground wires 210, 214 and ring wires 212, 216, thereby indicating to telephone company equipment that the lines have been seized. Holding coils 222, 224 have been designed to afford a relatively high impedance to audio signals while at the same time affording the necessary relatively low resistance for line seizures. Capacitors 226, 228 are inserted in the circuits to filter out high frequency transients that may possibly be found on lines A or B. Bridging transformers 230, 232 are DC isolated from telephone lines A and B by capacitors 234 and 236 respectively. The circuitry from the connections across the telephone lines to the isolating capacitors 234, 246 effectively constitutes a coupling device between the telephone lines and the diverter, thereby insuring that the diverter does not interfere with with telephone communications, that is, the diverter is compatible with telephone company specifications for equipment attached to telephone lines. The secondary of transformer 230 and the secondary of transformer 232 are each connected to a standard commercially available audio amplifier 238, powered by a 24 volt source 239. Thus, the audio amplifier 238 on the bridging path is not incorporated into the DC path of either telephone lines A or B. Switches 240, 242, 244, 246, 248, 250 can be used effectively to remove transformers 230, 232 from the circuit, thereby allowing, if desired, standard couplers supplied by the telephone company to be used. Because of the capacitance across relay 218, even when it is open, a secondary means is also provided by the relay 252 to isolate line B outputs from line A during reprogramming operations. Thus, the bridging circuitry of the present invention incorporates two transformers 230, 232 in contrast to the single transformer commonly used in the prior art. When a single transformer is used, the effective impedance of both lines A and B is governed by the interaction of said lines. Thus, a diverter connected to two different telephone exchanges or systems might well experience at the same time an impedance of, say, 600 ohms on line A and 1400 ohms on line B. The result would of course be an extreme mismatch. In the present invention, however, because of the use of two holding coils 222, 224 and two unterminated secondaries in transformers 230, 232, the effective impedance on line A is governed by line A itself and the effective impedance on line B is governed by line B itself rather than by the interaction of lines A and B. When automatic impedance compensation circuitry is included in the audio amplifier 238, the result is far more efficient audio bridging of lines A and B than is possible in the prior art.

The diverter of the present invention also incorporates an automatic bridging circuit (not shown). Said circuit uses a dial tone detector of the type described above, by selecting components of the RC circuit connected to the monostable multivibrator half-circuit 142 of FIG. 6 to reduce the integration period from 5 seconds to 100 milliseconds. As a result, said modified dial tone detector will respond to any audio information on line B and cause bridging to take place automatically. This feature allows the diverter of the present invention to effect smooth bridging operations automatically in a wide variety of otherwise incompatible telephone exchanges and systems. Further, bridging will occur even if a busy condition exists on the line which the diverter is programmed to divert the incoming call to. Thus a caller is informed that he should call back later instead of having his call aborted. As a backup, the diverter of the present invention also includes a thirty-second timer so that a bridging operation will occur at the end of 30 seconds even if no audio information is detected on line B.

Figure 7:
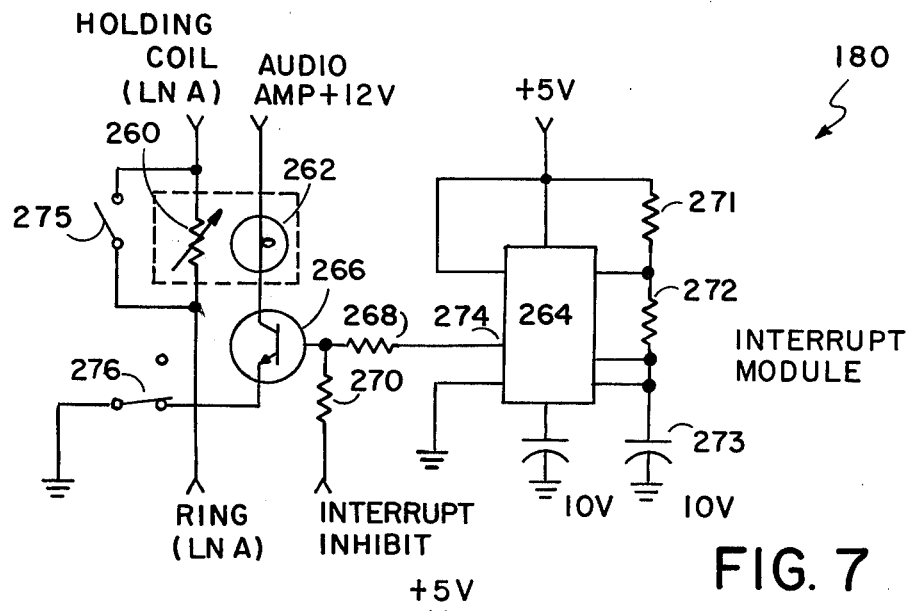
FIG. 7 is a schematic diagram of the interrupt module of the call diverter of FIG. 1.

FIG. 9 shows the interrupt circuit 180, which is shown further in FIG. 7. The function of the interrupt circuit is to interrupt the incoming line A when the audio bridge 42 between lines A and B is active, and to force a dial tone return when line A has terminated to reset call diverter 10 which returns the system to active standby mode.

Prior art diverters provide interrupt circuits which in most cases were undesirable and in some cases intolerable because of the noise they create on the audio lines. As illustrated in FIG. 9, the interrupt circuit 180 of the present invention is out of the audio loop. Most telephone company central exchanges are calling party control (CPC) exchanges and the failure of the caller to hang up will cause both lines and the diverter to remain connected. Also many exchanges are very slow in returning a dial tone even when the caller has hung up.

To avoid these problems, interrupt circuit 180 is activated once lines A and B are bridged. Circuit 180 is connected to line A. Circuit 180 includes a fixed timer such that every 30 seconds a pulse lasting 600 milliseconds interrupts line A. This pulse is barely audible, if audible at all, and is insufficient in duration to disconnect lines A and B during a diverted call. However, if the party calling on line A has terminated the call, the pulse from the interrupt circuit 180 will cause a disconnect to appear on line A and force an immediate return of a dial tone. Upon detection of the dial tone 45, call diverter 10 proceeds to a system reset 24, and returns to the active standby mode. By disconnecting the diverted call as soon as possible after its termination, call diverter 10 saves charges to the parties and frees the lines and diverter much earlier than prior art diverters. The prompt operation of interrupt circuit 180 also provides a prompt disconnect if there has been a malfunction in the operation of call diverter 10. The interrupt circuitry 180 is connected in series with the ring side 212 of incoming line A and the holding coil 222 of line A. Its essential components are a variable resistor 260 optically connected to an incandescent lamp 262, astable multivibrator 264, a driver transistor 266, and two resistors 268, 270. The interrupt circuitry is powered by the same plus 12 volt source 239 that powers the audio amplifier 238. The astable multivibrator 264 is calibrated by resistors 271, 272 and capacitor 273, connected in series, to have a charging time of approximately 30 seconds and by resistor 272 and capacitor 273 to have a discharge time of approximately 650 milliseconds. The output 274 of astable multivibrator 264 goes to driver transistor 266 through current limiting resistor 268. Said output, 274, normally high during the charging time, turns low on discharge. Because the output 274 of astable multivibrator 264 is normally high, transistor 266 is normally on, and as a result lamp 262 is on and the value of the variable resistor 260 is normally 100 ohms or less. But when astable multivibrator 264 times out, its output 274 turns low, thereby turning transistor 266 off, and as a result lamp 262 is extinguished causing variable resistor 260 to assume a value of approximately 100,000 ohms, which in effect opens or interrupts line A for approximately 650 milliseconds. When the caller is no longer on the line, such an interruption simulates an on-hook condition and forces the telephone exchange to return to a dial-tone immediately after output 74 turns high again. If the caller is still hangs line A, the interrupt will be heard, if at all, as only a barely audible faint click, that is, it does not interfere with the conversation but it does insure that the diverter will be reset promptly and automatically when the caller hangs up; there is no need to wait for the normal dial tone return from the telephone exchange which experience indicates can sometimes be as much as 5 minutes. The interrupt circuitry by contrast, forces an immediate return of dial tone. This is particularly important for cost reasons if the diverter has diverted an incoming call over toll or long distance lines. It is also important for functional reasons as a prompt disconnect frees the diverter to receive new programming information or to divert further calls. Further, prompt disconnect avoids any unnecessary trouble reports being made to the telephone company. Should an installer of the diverter of the present application want, for whatever reason, to inhibit the interrupt signal he closes switch 275, which is normally open, to take the variable resistor 260 out of the circuit by short circuiting it and opens switch 276, which is normally closed, to open up the emitter leg of transistor 266.

Figure 10:
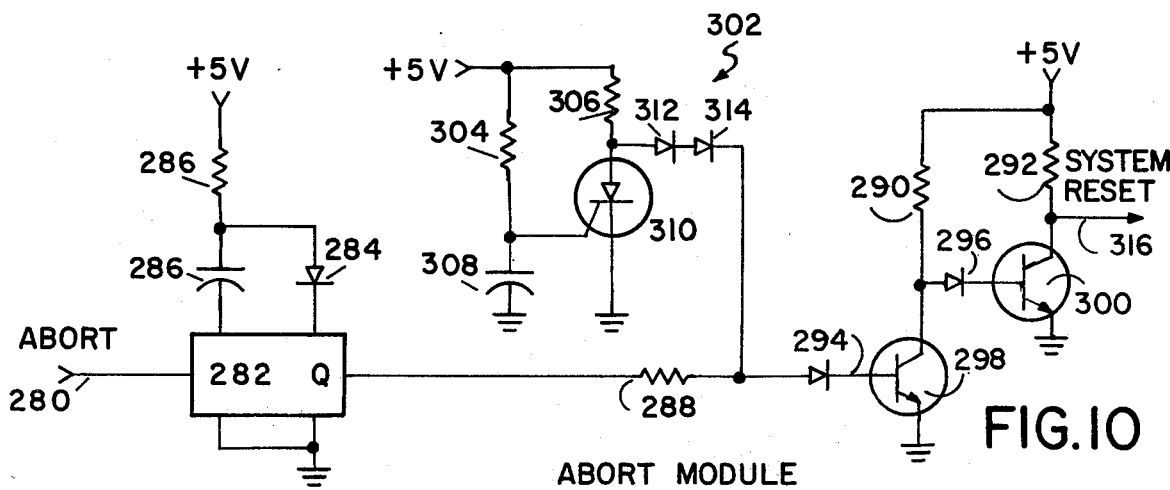
FIG. 10 is a schematic diagram of the above circuit of the call diverter of FIG. 1.

FIG. 10 illustrates the abort circuitry of the claimed diverter. Essentially, it converts an abort instruction received as an input at 280 from other circuitry into a system reset instruction at output 316. The abort circuitry comprises a non-retriggerable monostable multivibrator 282 connected with a compensating semiconductor diode 284 and an RC network 286 that controls the timing of monostable multivibrator 282, three resistors 288, 290, 292, two semiconductor diodes 294, 296, two transistors 298, 300 and an instantaneous power up network 302, the purpose of which is to protect the diverter's electronic memory from accepting as programmable information signals found in the diverter's electronics before it has become fully powered up. The instantaneous power up network 302 consists of resistors 304, 306, capacitor 308, a silicon controlled rectifier 310, and two semiconductor diodes 312, 314 which serve to isolate silicon controlled rectifier 310, which has a relatively high forward voltage from the anode to the cathode when it is on, from transistor 298. Thus, when the power is applied, capacitor 308 begins charging through resistor 304 until it reaches the threshold of the gate input of silicon controlled rectifier 310. While capacitor 308 is charging, silicon controlled rectifier 310 is in an off state, resulting in an on (or positive potential) condition being supplied to the base of transistor 298 through semiconductor diodes 312, 314, 294. Thus, as long as silicon controlled rectifier 310 is off, transistor 298 is on, thereby removing the forward bias condition from transistor 300, which results in a system reset instruction appearing as the output 316 of the abort circuitry. When power is disconnected, silicon controlled rectifier 310 turns off because its principal current source has been removed, and consequently it unlatches.

I claim:

1. An improved remotely programmable automatic telephone call forwarding and switching device for connection to two telephone lines from at least one central exchange and for switching incoming calls on the first one of said lines to outgoing calls on the second of said lines thus diverting incoming calls to a predetermined telephone number programmed by the subscriber comprising:

improved ring detection means connected to each of said two lines, detecting only ringing signals on each of said lines and retaining an indication of said ring until the switching function initiated by said ring is completed;

first circuit means connected to said ring detection means to determine sequence of operations depending on which line a ring has been detected on;

line seizure means to seize each of said telephone lines;

improved dial tone detection means to detect the presence of a dial tone on each of said subscriber lines;

programmable memory means capable of storing representations of telephone numbers to which incoming telephone calls are to be diverted;

tone decoding means to convert touch dial tone signals to serial pulse data for said programmable memory means;

second circuit means for programming said memory means via said tone decoding means and for reading the pulse information out of said memory means to the dialing means of the second of said telephone lines, to dial out a telephone call to the telephone number stored in said memory;

improved audio bridging means to establish an audio path between the first of said telephone lines and the second of said telephone lines;

automatic bridging means to determine when an audio path between said telephone lines is to be established;

an interrupt means to pulse the first of said bridged lines which is activated to determine the termination of the call on the first of said bridged lines and to force the return of said dial tone;

an abort circuit means to reset said switching device after completion of a switching function for any reason;

improved timing means connected to said ring detection means, said decoding means, said interrupt means, said read means, said dial tone detection means and said automatic bridging means to activate and terminate the operation of said means in a timed sequence compatible with telephone company equipment and operational standards.

2. The device of claim 1 wherein said improved ring detection means further comprises:

a ring detection circuit means connected to each of said telephone lines;

a variable resistor optically coupled to a neon tube which presents a relatively high resistance in the absence of a ring signal and low resistance in the presence of a ring signal, thereby detecting a ring signal;

a silicon controlled rectifier which is controlled by said optically coupled neon tube and variable resistor and is fired by the increased voltage resulting from the detection of a ring, thereby retaining evidence of the detection of a ring.

3. The device of claim 1 wherein said first circuit means further comprises:

means to determine which of said two telephone lines is ringing;

means to determine whether there is data in said programmable memory upon the detection of a ring on the first of said telephone lines;

means to activate said abort means upon determination of an absence of data in said programmable memory;

means to activate a timed sequence of steps to switch and forward an incoming call upon the detection of a ring on the first of said telephone lines and upon the determination of the presence of data in said programmable memory;

means to activate a timed sequence of steps to reprogram said programmable memory upon the detection of a ring upon the second of said telephone lines.

4. The device of claim 1 wherein said improved dial tone detection means further comprises:

an operational amplifier which filters out signals above eight hundred hertz;

a dual retriggerable monostable multivibrator, one part of which is adjusted to detect signals above one hundred eighty hertz whose frequencies are greater than its own frequency;

the second part of said dual retriggerable monostable vibrator adjusted to detect continuous tones of a certain duration compatible with the standards of duration of telephone company;

the satisfaction of both parts of said dual retriggerable monostable vibrator resulting in the detection of a dial tone.

5. The device of claim 1 wherein said programmable memory further comprises:

a shift register containing six registers;

each of said registers having a 32 bit capacity in the serial decimal numbering system;

said memory being a read-write memory.

6. The device of claim 1 wherein said tone decoding means further comprises:

a plurality of phase lock loops each of which is calibrated to detect one tone of a touch dial signal;

each of said phase lock loops having a voltage controlled oscillator whose frequency of oscillation is controlled by varying the values of resistors and capacitors.

7. The device of claim 1 wherein said automatic bridging circuit further comprises:

a dial tone detection means activated upon completion of a dial out on the second of said telephone lines after the detection of a ring on the first of said telephone lines;

said dial tone detection means being capable of detecting any audio noise on said second telephone line;

the detection of said audio noise resulting in activation of said audio bridging circuit;

a timing device in said automatic bridging circuit which activates said audio bridging circuit in the absence of the detection of audio noise after a predetermined lapse of time.

8. The device of claim 1 wherein said audio bridging means further comprises:

two bridging transformers each isolated from said two telephone lines;

an audio amplifier between said transformers and connected to the secondary of each of said transformers;

said transformers separated by said audio amplifier providing an automatic impedance matching between said two telephone lines.

9. The device of claim 1 wherein said improved timing means further includes:

a timer circuit having multiple inputs and outputs for varying the duration of its operation.

10. The device of claim 1 further including a touch dial pad for transmitting tone signals to said tone decoder locally over wires connecting said pad to said device and remotely over any telephone interconnected to the second of said telephone lines.

11. The device of claim 1 wherein said abort circuit means further comprises:

an instantaneous power-up network means itself comprising a plurality of resistors, capacitors, rectifiers, diodes and transistors, the function of which is to provide full electrical power immediately to the call diverter, when it is connected to an external source of power.

* * * * *